United States Patent
Johnson, Jr.

(10) Patent No.: US 6,926,527 B2
(45) Date of Patent: *Aug. 9, 2005

(54) METHOD AND APPARATUS FOR TRANSFERRING OR APPLYING A DRAWING TO A SURFACE

(76) Inventor: Theodore David Johnson, Jr., 30 Maple St., Closter, Bergen County, NJ (US) 07624

(*) Notice: Subject to any disclaimer, the term of this patent is extended or adjusted under 35 U.S.C. 154(b) by 95 days.

This patent is subject to a terminal disclaimer.

(21) Appl. No.: 10/046,837

(22) Filed: Jan. 15, 2002

(65) Prior Publication Data
US 2002/0123026 A1 Sep. 5, 2002

Related U.S. Application Data

(62) Division of application No. 08/975,983, filed on Nov. 21, 1997, now Pat. No. 6,343,934, which is a continuation of application No. 08/621,657, filed on Mar. 26, 1996, now abandoned.

(51) Int. Cl.$^7$ .............................................. G09B 11/10
(52) U.S. Cl. ........................................................ 434/84
(58) Field of Search ............................. 434/81, 84, 85, 434/87, 88, 90, 98, 103, 108, 110; 40/309, 310; 283/81; 206/229

(56) References Cited

U.S. PATENT DOCUMENTS

| | | |
|---|---|---|
| 714,806 A | 12/1902 | Lee .............................. 434/88 |
| 841,360 A | 1/1907 | Tuck |
| 1,480,458 A | 1/1924 | Mershon ..................... 446/147 |
| 1,606,724 A | 11/1926 | Rutman |
| 1,903,152 A | 3/1933 | Watson |
| 2,103,943 A | 12/1937 | Gorton ......................... 434/88 |

(Continued)

FOREIGN PATENT DOCUMENTS

| | | | |
|---|---|---|---|
| GB | 2205534 | 12/1988 | |
| GB | 2296684 | * 7/1996 | ............. B44C/1/10 |

OTHER PUBLICATIONS

Dutch Boy Kid's Room Paint brochure, Oct. 1995.*
Mayer, Ralph, The Artist's Handbook of Materials and Techniques, The Viking Press, NY, pp 76–83, 316–317, and 331–335, 1981.*

(Continued)

Primary Examiner—Kurt Fernstrom
(74) Attorney, Agent, or Firm—Walter J. Tencza (57) ABSTRACT

The present invention comprises a kit. The kit provides the ability to transfer a drawing to an object and to provide color and/or shading in the transferred drawing. A first sheet is provided having a first side and a second side, the first side including a drawing which is comprised of a plurality of regions. The kit also typically includes a second sheet comprised of a means for transferring a drawing. The kit further includes a tangible medium on which information indicative of the color or shading of the regions is fixed. The means for transferring a drawing is typically comprised of carbon. A instrument is preferably provided for rubbing over the first side of the first sheet to cause a portion of the drawing to transfer to the surface of an object. The first sheet and second sheets are preferably mural length. A method is also provided in one embodiment comprising placing a drawing comprised of a plurality of regions on a first side of a first sheet, fixing information indicative of the color or shading of the regions of the drawing in a tangible medium, and placing a second sheet on the second side of the first sheet, the second sheet comprised of a means for transferring a drawing. In another embodiment the drawing is provided on a unified wallpaper sheet. In still another embodiment the drawing is provided on a transparent sheet to be transferred by rubbing, solvent, or by heat.

8 Claims, 11 Drawing Sheets

U.S. PATENT DOCUMENTS

| | | | | |
|---|---|---|---|---|
| 2,744,349 A | | 5/1956 | Grossman | 41/26 |
| 2,825,150 A | | 3/1958 | Steiner | 35/26 |
| 2,954,615 A | | 10/1960 | Brown | 35/26 |
| 3,040,447 A | | 6/1962 | Baldanaza | 35/26 |
| 3,142,082 A | | 7/1964 | Harwood | 15/210.5 |
| 3,278,007 A | * | 10/1966 | Weber | 206/1.8 |
| 3,284,927 A | * | 11/1966 | Milne | 434/84 |
| 3,359,228 A | * | 12/1967 | Nichols | 523/351 |
| 3,364,598 A | | 1/1968 | Cook | 434/88 |
| 3,372,493 A | | 3/1968 | Birch | 35/26 |
| 3,414,343 A | * | 12/1968 | Thomas | 312/231 |
| 3,433,485 A | | 3/1969 | Renn et al. | 273/157 |
| 3,447,250 A | | 6/1969 | Savage | 35/26 |
| 3,589,507 A | | 6/1971 | Greenberg | 206/47 |
| 3,802,904 A | | 4/1974 | Morrison | 434/84 |
| 3,815,265 A | * | 6/1974 | DePauw | 434/103 |
| 3,849,911 A | | 11/1974 | Longenecker | 434/84 |
| 4,018,332 A | | 4/1977 | Benda | 206/223 |
| D256,556 S | * | 8/1980 | Fish | D9/308 |
| 4,312,688 A | | 1/1982 | Brodis et al. | 156/63 |
| 4,328,051 A | | 5/1982 | Robinette | 35/26 |
| 4,355,722 A | | 10/1982 | Lemmeyer | 206/575 |
| 4,416,632 A | * | 11/1983 | Berman | 434/84 |
| 4,446,986 A | * | 5/1984 | Bowen et al. | 220/789 |
| D274,916 S | * | 7/1984 | Hunt | D19/28 |
| D279,548 S | * | 7/1985 | Schildknecht | D9/307 |
| 4,657,800 A | | 4/1987 | Long | 428/102 |
| 4,696,400 A | | 9/1987 | Warman | 206/575 |
| 4,815,607 A | * | 3/1989 | Agapiou | 206/579 |
| 4,828,497 A | | 5/1989 | Kurgan | 434/96 |
| D313,745 S | * | 1/1991 | Akman | D9/307 |
| D315,628 S | * | 3/1991 | Newarski | D3/271 |
| 5,099,773 A | | 3/1992 | Codos | 112/266 |
| 5,106,305 A | | 4/1992 | Grant | 434/84 |
| 5,141,438 A | | 8/1992 | Spector | 434/81 |
| 5,209,663 A | | 5/1993 | Wilcox et al. | 434/84 |
| 5,213,504 A | | 5/1993 | Lee et al. | 434/84 |
| 5,217,763 A | | 6/1993 | Boury | 428/11 |
| 5,242,496 A | | 9/1993 | Handy | 434/84 |
| 5,292,255 A | | 3/1994 | Goldwasser | 434/84 |
| D348,181 S | * | 6/1994 | Lambert et al. | D7/613 |
| D350,066 S | * | 8/1994 | Silva et al. | D9/308 |
| 5,372,506 A | | 12/1994 | Hambright | 434/84 |
| D357,386 S | * | 4/1995 | Jones | D7/606 |
| 5,435,240 A | | 7/1995 | Fromm | 101/33 |
| 5,562,451 A | * | 10/1996 | Wilcox et al. | 434/84 |
| 5,687,000 A | * | 11/1997 | Nakaoka | 358/296 |
| 6,045,639 A | * | 4/2000 | Davis | 156/62 |
| 6,217,336 B1 | * | 4/2001 | Matthews | 434/84 |

OTHER PUBLICATIONS

Dutch Boy Kid's room Patent Reference: Oct. 1995 (inventor may able to predate).

Decorator's Palette Reference;; Spring 1994/.

"Anyone Can Paint" Product Label.

"Liquitex" documentation, and label.

"How to Create Fantasy Finishes with flair & imagination" Benjamin Moore Paints, Printed in Canada Jan. 1991.

"Faux Finesse" Benjamin Moore Paints.

"Artistic Finishes" Ace Quality Paints,:The fun way to bring out the artist in you.

"Ideas Elle Deco" In Spanish.

"A Trio of Great Ideas for Kids" Lynette Jennings Homework's, Special Supplement to Canadian Living, vol. 7.

"All My children" from Better Homes and Garden, Mach 1996, inventor may be able to predate.

"Style Getting It Done, Combining," Apr. 1995.

"Fresh Paint".

Reference to Cutting Silhouettes.

Publication: National Decorating Products Assoc., 1050 N. Lindbergh Blvd., St. Louis, M0., Copyright 1983, pp. 1, 2, 48, 56, & 2 unnumbered.

Book: Living Chronicle Books, 275 Fifth Street, San Francisco, CA 94103, Copyright 1995 by Margaret Walch & Augustine Hope, 9 pages.

Boyles, Margaret, "Country–Style Stenciling,"pp. 12–23. 28–29, 34–35 and 80–83. Date: 1991 Meredith Press, Meredith Corporation, ISBN 0696–02337–7.

Eaglemoss Publications Ltd., "Paint Craft," pp./ 57–64 and 97–100. ISBN 0–89134–650–3.

"Color A Stroke of Brilliance" book 1993; Published by Benjamin Moore.

Brochure entitles "Quality", copy 1995.

Video "Fantasy Finishes and Beyond,".

Video "Faux Finesse,".

The Art of Painted Finishes (1971).

Paint Magic (1981).

Paint Finishes (1985).

Floorworks (1988).

Wallworks (1988).

Decorating Magic (1992).

Creative Paint Finishes for the Home (1992).

Recipes for Surfaces (19930.

Country Finishes (1993).

Fantastic Painted Finishes (1994).

Folk Finishes (1994).

Decorative Painting for the Home (1994).

Master Works (1994).

The Encyclopedia of Decorative Paint Techniques (1994.

Grand Finishes (1994).

Paint Recipes (1996).

Paint Decorating with Water Base Paint (1996).

The Complete Book of Paint. (1996).

* cited by examiner

| A1 yellow 1 Pint | A2 lt. yellow 0 Pints | A3 med.. yellow 0 Pints | A4 blue 0 Pints |
| B1 lt. blue 2 Pints | B2 med. blue 0 Pints | B3 dark blue .5 Pints | B4 green .5 Pints |
| C1 lt. green 3 Pints | C2 med. green .5 Pints | C3 red 0 Pints | C4 lt. red .5 Pints |
| D1 pink 1 Pint | D2 lt. red 0 Pints | D3 brown 0 Pints | D4 lt. brown .1 Pints |

METHOD AND APPARATUS FOR TRANSFERRING OR APPLYING A DRAWING TO A SURFACE

CLAIM FOR PRIORITY

This application is a divisional of and claims priority of patent application Ser. No. 08/975,983 filed on Nov. 21, 1997 now U.S. Pat. No. 6,343,934 which is a continuation of patent application Ser. No. 08/621,657, filed on Mar. 26, 1996 now abandoned and claims priority of patent application Ser. No. 08/621,657. The continued prosecution application was co-pending at the time of the filing of the divisional. The inventor is the same. No new matter has been introduced.

FIELD OF THE INVENTION

This invention relates to the field of kits which aid in displaying art works on the surface of objects.

BACKGROUND OF THE INVENTION

"Paint by numbers" is a technique by which individuals with little artistic ability can create satisfactory works of art. In this technique, a sheetlike material with a painting surface on one side and a hard cardboard surface on the other side is provided. The painting surface typically includes a skeletal outline of the painting. The skeletal outlines are prepared in advance by an artist. Within particular regions numbers are typically shown. Each number corresponds to a different color. However, "Paint by numbers" as known in the art, does not enable one to transfer a drawing to another object such as a wall.

One painting system known in the art provides cardboard cutouts to assist in painting drawings on a surface. A sponge is used to sponge paint colors inside the cutouts. This system is difficult to implement and difficult to manufacture.

SUMMARY OF THE INVENTION

The present invention in one embodiment comprises a kit. The kit preferably provides the ability to transfer a drawing to the surface of an object so that the drawing becomes substantially fixed to the surface of the object, and to provide color and/or shading in the transferred drawing. The term drawing is used in this application in a broad sense and includes any image. The kit is preferably comprised of a first sheet having a first side and a second side. The first side includes a drawing which is comprised of a plurality of regions. The kit also typically includes a second sheet comprised of a means for transferring the drawing. The second sheet is preferably attached to the second side of the first sheet. In one embodiment of the invention the first and second sheets are unified into a unified sheet. The kit further includes a tangible medium on which information indicative of the color or shading of the regions is fixed.

The means for transferring the drawing is typically comprised of carbon. An instrument is preferably provided for rubbing over the first side of the first sheet to cause a portion of the drawing to transfer to the surface of an object.

The tangible medium for the color or shading information can be comprised of the first sheet itself. The information indicative of the color or shading of the regions can be comprised of a plurality of symbols, each symbol corresponding to a particular color or shading, wherein at least one symbol is fixed, typically by being printed, in each region of the drawing. Alternatively or additionally, a separate card comprising a color or a shading matched with its corresponding symbol, can be provided. The tangible medium may also be comprised of videotape or audiotapes or any other medium.

The instrument can be in the form of a pencil. The first sheet and second sheets are preferably mural length and typically have a length and a width greater than any paper size which would conventionally be used for writing, such as greater than fourteen inches and a height greater than eight and a half inches. In some embodiments the first and second sheets can be four feet by six feet, six feet by eight feet, eight feet by ten feet, and many other sizes.

The drawing is preferably a skeletal line drawing and the regions are typically separated by lines.

A method is also provided in one embodiment comprising placing a drawing comprised of a plurality of regions on a first side of a first sheet, fixing information indicative of the color or shading of the regions of the drawing in a tangible medium, and placing a second sheet on the second side of the first sheet, the second sheet comprised of a means for transferring the drawing. The second sheet may merely be a backing which is provided to the second side of the first sheet.

In another embodiment of the present invention a projector is used to display a drawing onto the surface of an object. A user then traces over the drawing to transfer the drawing, and substantially fix the drawing, onto the surface of the object. Color and/or shading information is preferably provided as in other embodiments.

In another embodiment a large, preferably mural size, substantially non-repeating drawing is placed on a unified wallpaper sheet which is physically divided into sheet segments. Each sheet segment is placed on the surface of an object, such as a wall, by an adhesive or self adhesive, such as known in the art. When all the sheet segments are placed on the wall, a large, mural-like art work is formed. The wallpaper sheet can be either a line drawing or a completed full color mural which is pre-made.

In yet another embodiment a large drawing, such as a mural, is imprinted in reverse form on a first side of a sheet. The first side of the sheet is pressed against a surface and then the drawing is transferred to the surface by applying a solvent, by heat, or by rubbing or in some other manner known in the art. The sheet in this embodiment is preferably transparent and preferably the sheet is to be removed after the drawing has been transferred to the surface. Again the sheet may transfer a line drawing or a full color completed drawing. Preferably the drawing is a mural.

The present invention in many embodiments permits a non-artist to easily transfer outlines of works of art, cartoon characters, or any graphic images, to surfaces of objects such as walls, ceilings, or doors. It also provides a method and apparatus by which color and/or shading can be provided to the outlines on the surface of the objects. The present invention can be employed in all aspects of home decorating.

The present invention is particularly useful in young children's rooms. With the appropriate licenses secured, children's favorite cartoon characters can be displayed, particularly mural size, which usually will be greater than four feet by six feet. This size is greater than most posters and will cover a large portion of a surface, such as a wall or ceiling. The present invention allows high quality art work to be created by novice artists. It is particularly applicable to applying murals or large substantially non-repeating art works to walls or ceilings.

DETAILED DESCRIPTION OF THE DRAWINGS

Figure 1:
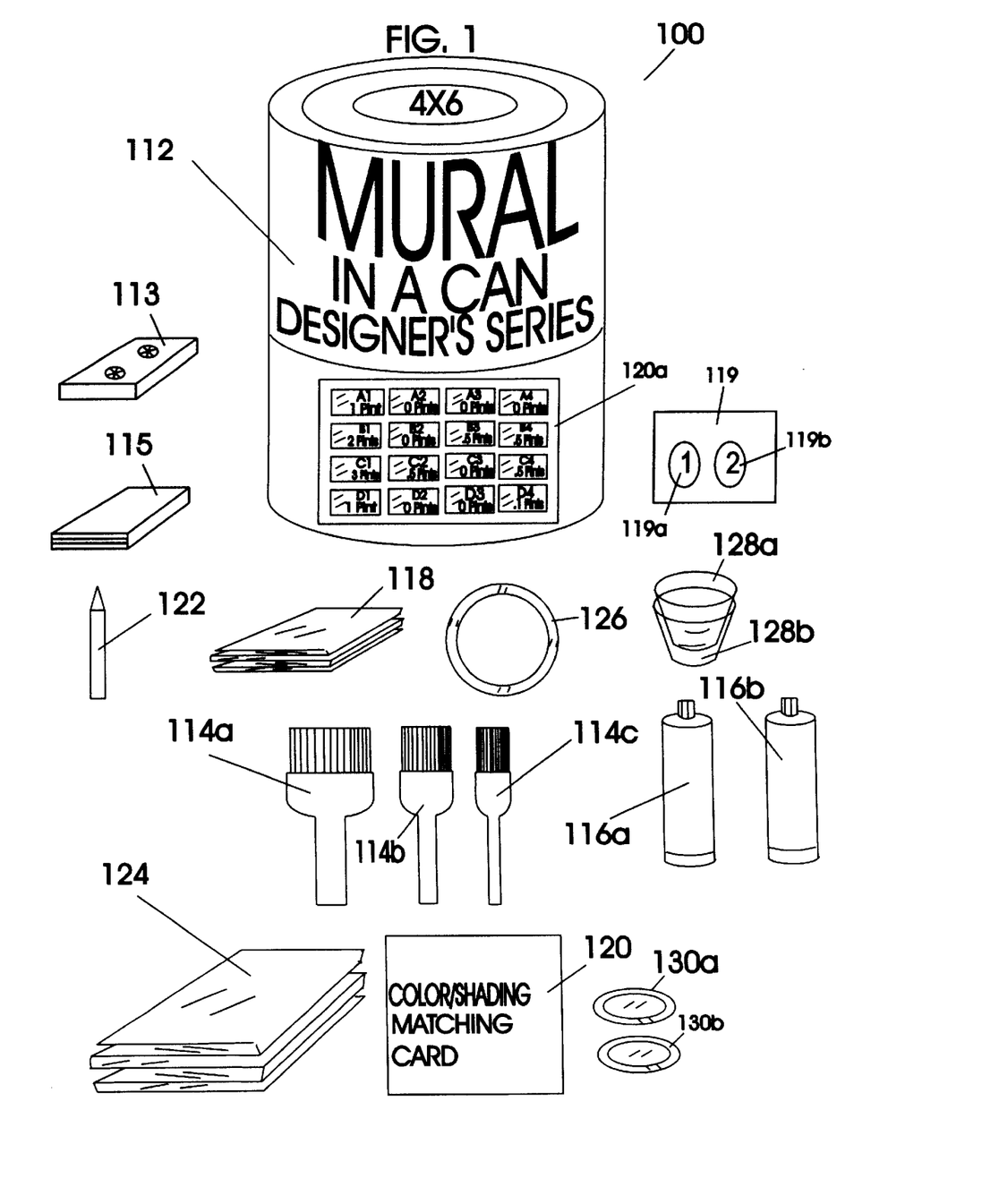
FIG. 1 illustrates a kit for displaying an art work.

FIG. 1 is an illustration of a kit 100 for displaying an art work, drawing, or image on the surface of an object. The kit 100 typically includes a container 112, video tape 113, paint brushes 114a, 114b, 114c, written instructions 115, tube of white tint base 116a, tube of black tint base 116b, unified sheet 118, stickers sheet 119, color/shading matching card 120, pencil 122, drop cloth 124, roll of masking tape 126, mixing cups 128a and 128b, and lids 130a and 130b. The components of the kit 100 are preferably wrapped in cellophane or packaged in some other way, known in the packaging art, to prevent them from falling out of the container 112.

The container 112 could be a paint can or box or any other container, although a paint can or a simulated paint can made out of cardboard is preferred. The symbol "4×6" is used at the top of the container 112 to show the size of the drawing to be transferred, which in this case is four feet by six feet. The video tape 113 is preferably provided to give instructions on how to transfer the drawing, how to paint the drawing, and how to mix colors if necessary. The written instructions 115 preferably provide a similar type of information. The stickers sheet 119 includes self adhesive stickers 119a and 119b. Preferably one self adhesive sticker is provided for each mixing cup. For example self adhesive sticker 119a corresponds to mixing cup 128a and sticker 119b corresponds to mixing cup 128b. Thirty-two mixing cups and stickers, others not shown, are preferably provided. Each of the stickers 119a and 119b has a number printed on it identifying a particular color. For example, sticker 119a has the number "1" printed on it identifying a particular color, while sticker 119b has the number "2" printed on it identifying a different color. In one embodiment the numbers "00" through "30" are provided, as will be described, representing thirty-two colors. Each sticker has one of the thirty-two numbers. Thirty-two mixing cups are provided in this embodiment, one for each sticker.

Brushes which are used with latex paint are preferred for the brushes 114a–c, although any type of brushes or paints can be used. A standard no. 2 colored lead pencil or any hard conical pointed instrument that would not cut through or damage the unified sheet 118, can be used for the pencil 122. A colored pencil is preferred so that a user can see the areas on the unified sheet 118 that he has already transferred or gone over with the pencil 122.

The cups 128a–b preferably fit inside one another. The cups 128a–b are preferably clear plastic. The lids 130a and 130b also preferably fit inside one another. The lids 130a and 130b are preferably provided to seal cups 128a and 128b when the paint is to be stored for a period of time. Typically more cups and lids are provided, although for convenience only two are shown in FIG. 1.

Figure 2A:
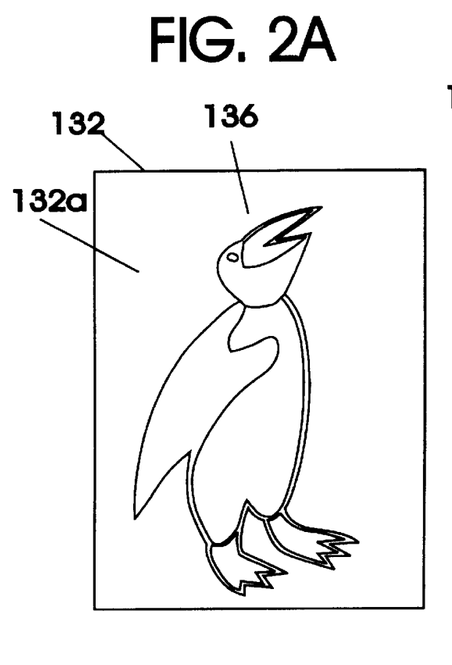
FIGS. 2A–B illustrate first and second sides of a first sheet.
Figure 2B:
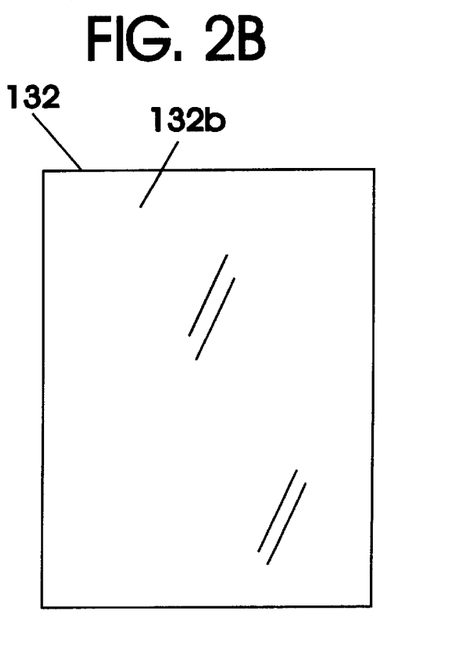
Figure 2C:
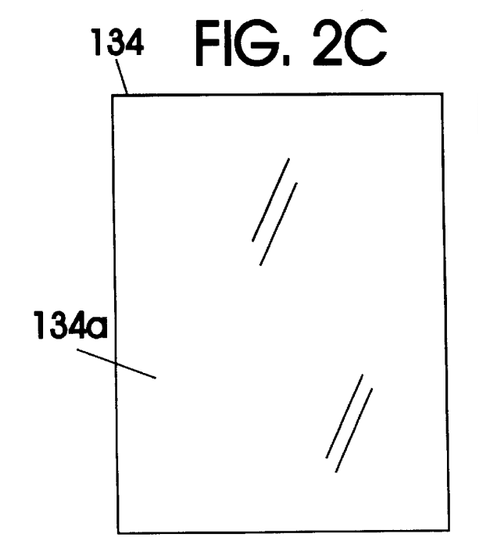
FIGS. 2C–D illustrate first and second sides of a second sheet.
Figure 2D:
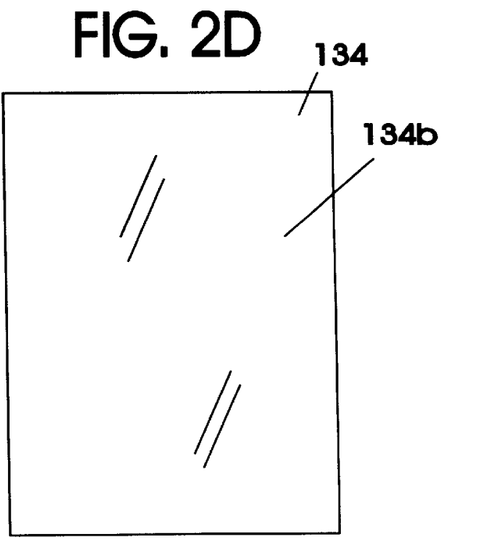
Figure 3:
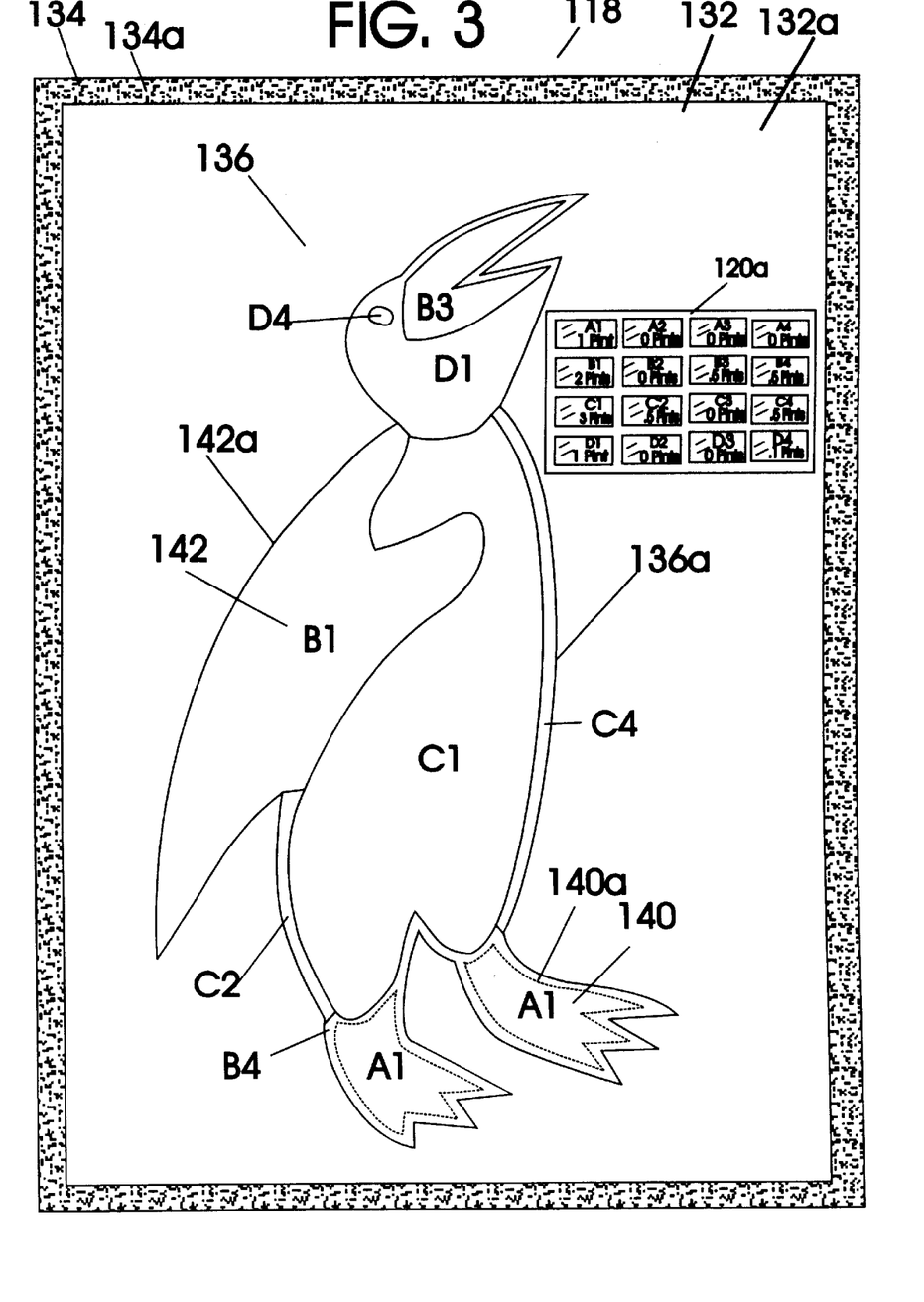
FIG. 3 illustrates the first sheet of FIGS. 2A–2B laid on top of and attached to the second sheet of FIGS. 2C–2D.

As shown in FIGS. 2A–2D, the unified sheet 118 is typically comprised of a first sheet 132 and a second sheet 134. A first side 132a of the first sheet 132 is shown in FIG. 2A. The first side 132a has printed thereon a drawing 136. In FIG. 2A, the drawing 136 is a skeletal outline of a bird. A second side 132b of the first sheet 132 is shown in FIG. 2B. A first side 134a and a second side 134b of the second sheet 134 are shown in FIGS. 2C and 2D, respectively. The first sheet 132 is typically placed or laid on top of the second sheet 134 as shown in FIG. 3. The second sheet 134 is intentionally shown to be larger than the first sheet 132 in FIG. 3, although typically the sheets will be the same size and preferably exactly overlap. The second sheet 134 is typically attached to the second side 132b of the first sheet 132. The second sheet 134 can also take the form of a backing which is integrally a part of the second side 132b of the first sheet 132. The unified sheet 118 is preferably folded in a map-like way as shown in FIG. 1, to easily insert it within the container 112.

The first sheet 132 is preferably made of a thin paper and is preferably not comprised of cardboard. The second sheet 134 is comprised of a means for transferring a drawing, which is preferably carbon. The means for transferring can also be any transferring medium, such as powdered chalky substances known in the art which are available in different colors, which are typically lighter colors such as red, blue, and yellow, for use when a lighter transfer medium is needed. These substances typically need pressure to release and transfer the carbon and/or the color to a surface.

FIG. 3 shows an enlarged version of the drawing 136 which appears on the first side 132a of the first sheet 132. The drawing 136 comprises a plurality of regions such as regions 140 and 142. Each region is preferably delimited or outlined by a closed curve such as closed curve 140a for region 140 and closed curve 142a for region 142. It is preferred that each region contain a symbol printed inside the region indicative of color or shading. For example, region 140 has the symbol "A1" printed therein while region 142 has the symbol "B1" printed therein. The symbols "A1" and "B1" are indicative of color and/or shading as will be described.

Region 140 is shown outlined by a dotted closed curve 140a whereas region 142 is shown outlined by a solid line closed curve 142a. The dotted lines are used in this embodiment to indicate that the color, corresponding to symbol "A1", should be painted before the color corresponding to symbol "B4". I.e. in this embodiment the regions enclosed by dotted lines are preferably painted first and the regions enclosed by solid lines are preferably painted afterwards. The dotted line close curves preferably enclose regions to be painted with lighter colors and the solid line close curves preferably enclose regions to be painted with darker colors. Painting lighter colors first allows errors which are made in painting the lighter colors to be corrected or blocked out by later darker colors. This allows a better painting to be produced. Dotted lines may also be shown on a scaled down drawing either on the container or on a separate sheet to indicated that colors "butt up" against each other. In contrast solid lines may be used to indicate that other colors appear "within" the solid line, on the actual full length mural.

Figure 4A:
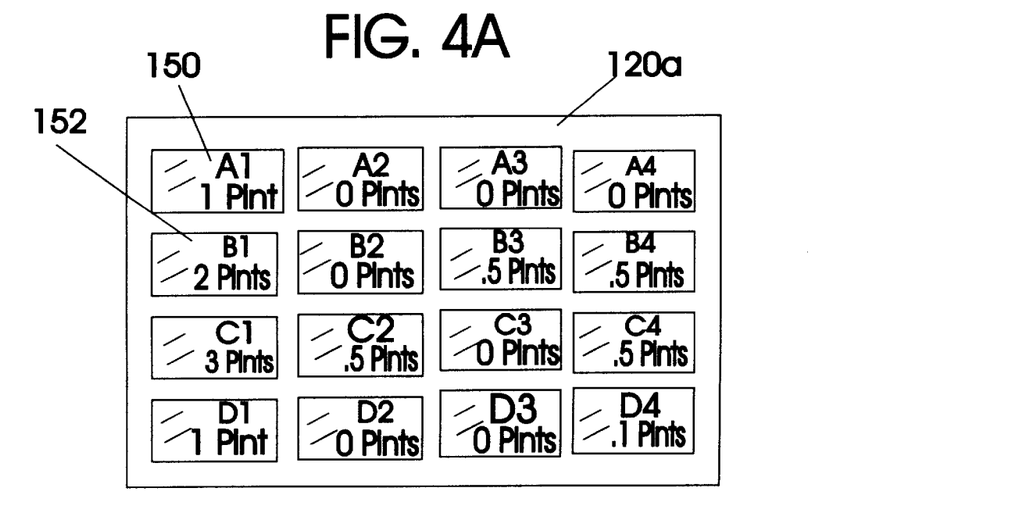
FIG. 4A illustrates a color and/or shading matching card, shown with the color corresponding to a particular symbol.
Figure 4B:
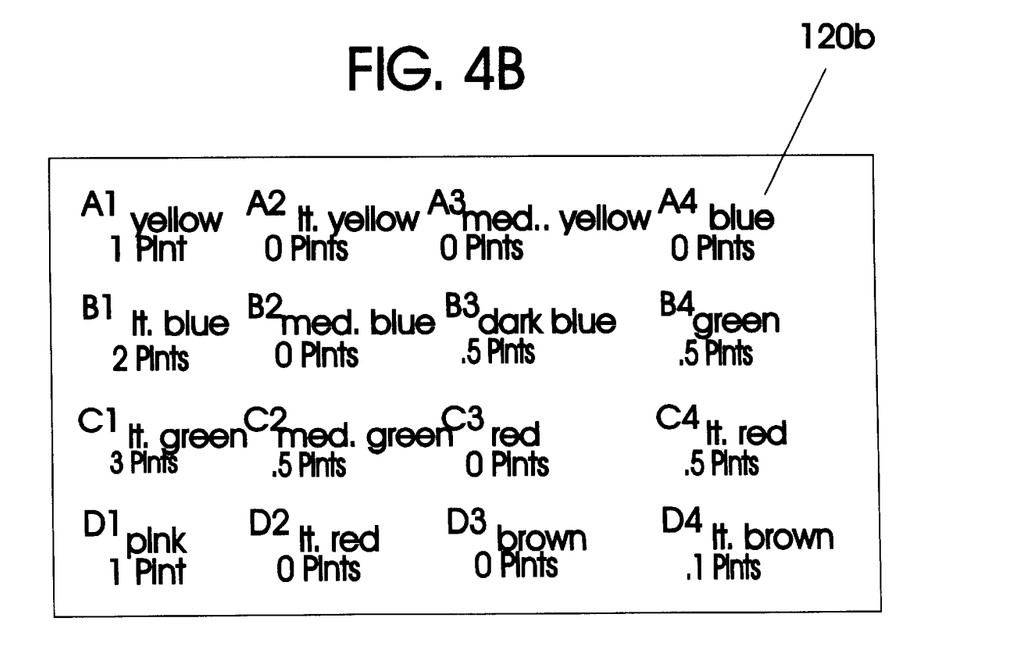
FIG. 4B illustrates a color and/or shading matching card, shown with the color name corresponding to a particular symbol.

Two versions of the color/shading matching card 120 shown in FIG. 1 are shown in FIGS. 4A and 4B. FIG. 4A directly matches or correlates the symbols "A1" through "D4" with the appropriate colors (not shown in color) For example the symbol "A1" is shown printed in a box 150 which is preferably colored in yellow. The symbol "B1" is shown printed in a box 152 which is preferably colored in light blue. The other symbols of the symbols "A1" through "D4" are also printed in boxes which are colored in the appropriate color.

Alternatively, the symbols "A1" through "D4" can be matched with the name of the color as opposed to the color itself, as shown in FIG. 4B, for the color/shading matching card 120b. For example, to the right of the symbol "A1" on the color/shading matching card 120b is the name for the color yellow.

The color/shading matching card 120 provided may include the actual color of the paint, a color code used by the manufacturer of the paint, and amounts needed for each type of paint. The color/shading matching card 120 may be two inches by five inches, or any standard computer color matching card size. The color/shading matching card 120 may be in the form of a label placed on the container 112 or separate from the container 112 but placed in the container 112. Alternatively or additionally, the information concerning color and/or shading indicia can be provided in another tangible medium such as on the first side 132a of the first sheet 132 or on a video tape or audiotape.

In operation, a user places the unified sheet 118 over a surface of an object, such as a wall, with the first side 132a face up so that the drawing 136 is visible to the user and so that the second sheet 134 contacts the surface of the object. The unified sheet 118 is preferably taped in place by masking tape 126 onto a wall, so that the unified sheet 118 is substantially fixed. The taping ensures registration, i.e. that the unified sheet 118 doesn't shift around while the drawing 136 is being transferred. After the unified sheet 118 is secured, a user preferably rubs pencil 122 or another instrument against the drawing 136 and traces over the skeletal outline 136a, shown in FIG. 3, of the drawing 136. The pencil 122 can also be used to trace over the symbols, such as "A1" in each region of the drawing 136. However, it may be preferable to not trace over the symbols so that there are no marks inside the coloring or shading areas in some cases. In some embodiments the unified sheet 118 will have no symbols located on it but rather the indicia of color and/or shading will be provided completely in another tangible medium. Alternatively, the drawing 136 can be a completed drawing with colors already provided instead of a skeletal line drawing. Pre-done murals can be transferred to any surface by solvent, heat, by rubbing, or by any pressure.

The unified sheet 118 may be provided with information or characteristics that permit customizing the application to a surface. For example shaded areas, perforated holes, or X's can be placed on the unified sheet 118, to signify areas that can be omitted from the overall mural to go around windows, radiators, or other obstacles around which painting is to occur or the drawing 136 is to be traced, or applied. Alternatively more sophisticated information may be used to customize around doors or windows so that aesthetically pleasing effects are achieved. Images or drawings can be reversed, flopped, shifted, or reconfigured as known by those skilled in the art.

Figure 5A:
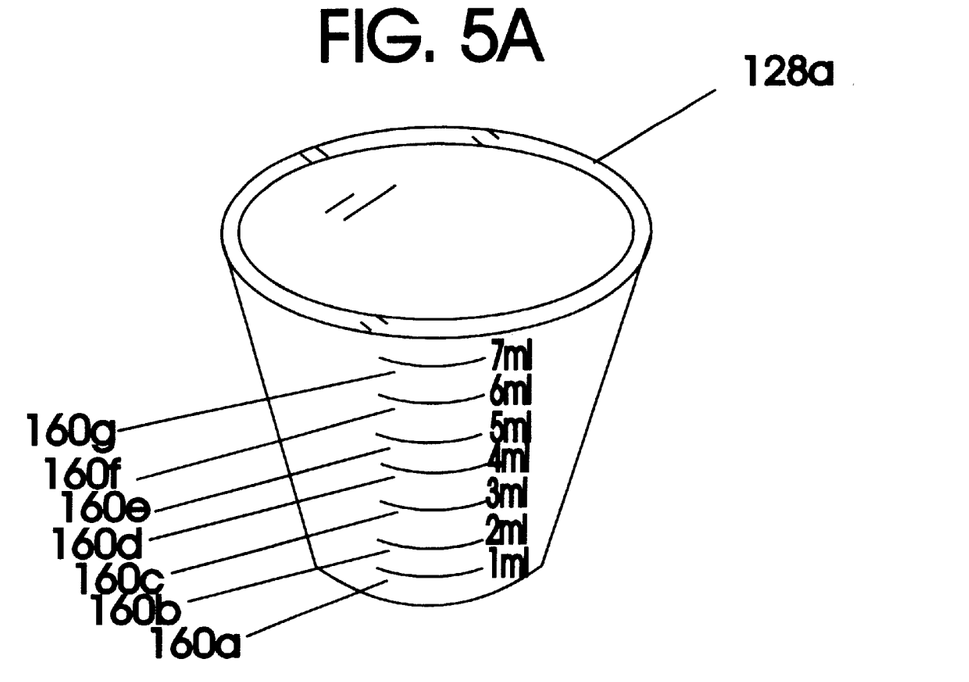
FIG. 5A illustrates a measuring cup with tick marks for mixing colors having millimeters as units.

It is preferred that a user not have to purchase all the colors required for a painting. For this reason measuring cups are provided. FIG. 5A illustrates a measuring cup 128a with tick marks for mixing colors. The measuring cup 128a is comprised of tick marks 160a through 160h. Each tick mark is marked with a certain number of units. Tick mark 160a refers to 1 ml or 1 milliliter. To place 1 milliliter of paint in the measuring cup 128a, the paint must be filled up to the tick mark 160a. Any units can be used for the tick marks. Tick marks 160b through 160g refer to 2 ml, two milliliters, through 7 ml, seven milliliters, respectively.

Figure 5B:
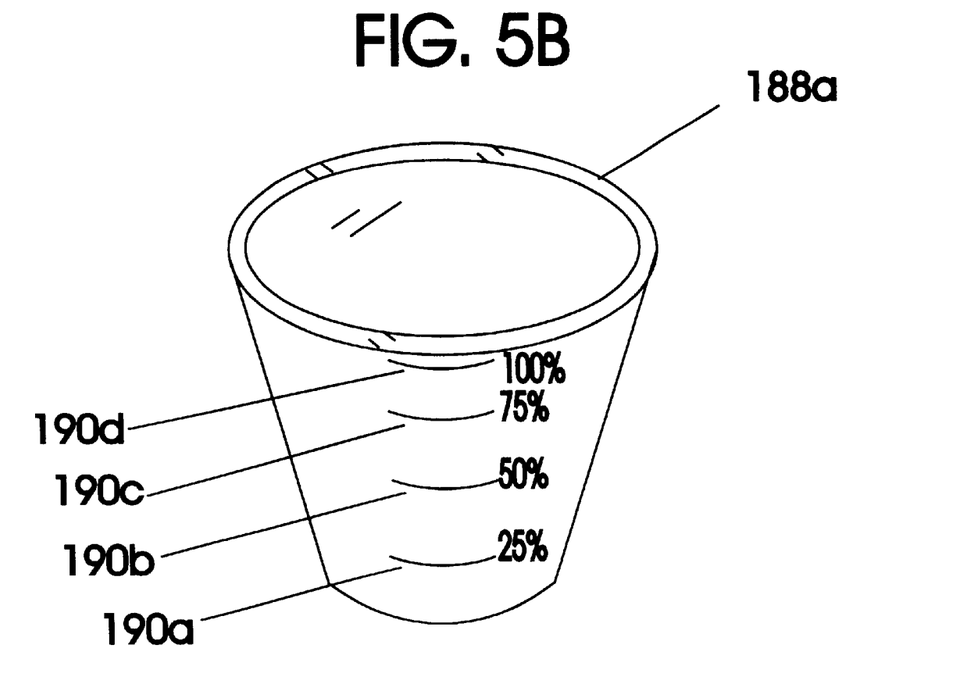
FIG. 5B illustrates a measuring cup with tick marks for mixing colors having percentages as units.

Another example of a mixing cup, is mixing cup 188a shown in FIG. 5B. Mixing cup 188a provides tick marks which are marked with a percentage. In this case the units are twenty-five percent (25%) each. Mixing cup 188a has tick marks 190a, 190b, 190c, and 190d, which are marked with units or percentages or 25%, 50%, 75%, and 100% respectively.

In one embodiment of the present invention the user need only purchase a few color paints but will be able to provide many more colors to the transferred drawing. In this embodiment, tint bases, such as white tint base 116a and black tint base 116b, shown in FIG. 1, in conjunction with the measuring cups 128a and 128b and other measuring cups not shown, and/or measuring cup 188a and other measuring cups not shown, are used to extend the number of colors available. The tubes of white tint base 116a and black tint base 116b are preferably large tubes such as sixty-four ounce or thirty-two ounce tubes. This method of extending the color range will be described with reference to the chart below and with reference to the detailed drawing 236, in FIG. 6. The percentage units employed by measuring cup 188a will be used for the chart below.

Tint bases other than white and black can be used in accordance with the present invention.

The order of providing a tint base first, then a first color, and then a second color is preferred. Percentages refer to a percentage of the measuring cup 188a. The "X's" shown indicate that preferably no such color or tint base is applied. For example an "X" in the "First Color" Column indicates that no first color paint is applied.

Color Indicia Code and Extending chart:

| Color Code | Tint base | First Color | Second Color | Resulting Color |
|---|---|---|---|---|
| 00 | Black Tint Base: 100% | X | X | Black |
| 0 | White Tint Base: 100% | X | X | White |
| 1 | X | Yellow: 100% | X | Yellow |
| 2 | White Tint Base: 25% | Yellow: 50% | X | Medium Yellow |
| 3 | White Tint Base: 50% | Yellow: 25% | X | Light Yellow |
| 4 | X | Green: 100% | X | Green |
| 5 | White Tint Base: 25% | Green: 50% | X | Medium Green |
| 6 | White Tint Base: 50% | Green: 25% | X | Light Green |
| 7 | Black Tint Base: 25% | Green: 75% | X | Dark Green |
| 8 | X | Blue: 50% | Green: 50% | Blue-Green |
| 9 | X | Blue: 100% | X | Blue |
| 10 | White Tint Base: 25% | Blue 50% | X | Medium Blue |
| 11 | White Tint Base: 50% | Blue: 25% | X | Light Blue |
| 12 | White Tint Base: 50% | Black Tint Base: 25% | Blue: 25% | Light grey-blue |
| 13 | White Tint Base: 25% | Black Tint Base: 25% | Blue: 25% | Dark Grey Blue |
| 14 | X | Red: 50% | Black: 50% | Brown |
| 15 | White Tint Base: 50% | Brown: 25% | X | Light Brown |
| 16 | White Tint Base: 25% | Brown: 50% | X | Medium Brown |
| 17 | Black Tint Base: 25% | Brown: 75% | X | Dark Brown |
| 18 | X | Purple: 100% | X | Purple |
| 19 | White Tint Base: 50% | Purple: 25% | X | Light Purple |
| 20 | White Tint Base: 25% | Purple: 50% | X | Medium Purple |
| 21 | Black Tint Base: 25% | Purple: 75% | X | Dark Purple |
| 22 | X | Red: 100% | X | Red |
| 23 | White Tint Base: 50% | Red: 50% | X | Pink |
| 24 | X | Pink: 25% | Red: 50% | Light Red |
| 25 | Black Tint Base: 25% | Red: 75% | X | Medium Red |
| 26 | Black Tint Base: 50% | Red: 50% | X | Dark Red |
| 27 | X | Yellow: 50% | Red: 50% | Orange |
| 28 | White Tint Base: 25% | Orange: 50% | X | Light Orange |
| 29 | X | Med. Red: 25% | Orange: 50% | Medium Orange |
| 30 | X | Dark Red: 25% | Orange: 50% | Dark Orange |

The above chart can be provided on a color and/or shading matching card such as color/shading matching card 120 in FIG. 1. Alternatively the chart can be provided separately in the container 112 and preferably on the videotape 113. An individual would first preferably provide the tint base to the measuring cup, such as measuring cup 128*a*, in the quantity indicated. The individual would then apply the appropriate first color and second color (if any) in the quantities indicated to get the appropriate resulting color. The present invention in this embodiment allows an individual to purchase only a few color paints but to have the ability to extend the color range to many more colors. Preferably a measuring cup (such as measuring cup 128*a*) is provided for each color to be made. In this case, thirty-two (32) measuring cups would be provided. The paints and/or tint base paints preferably are mixed together in the measuring cups using a small brush. Mixing is preferably done using the smallest brush provided, which is brush 114*c* in FIG. 1, or by using a mixing stick. Finished colors can be dabbed next to a color card having colors to check accuracy.

It is contemplated in accordance with the present invention that two colors of any kind could be mixed together. In fact any number of colors, or colors and tint bases, or tint bases alone, can be mixed together to provide a new shade or color.

Figure 6:
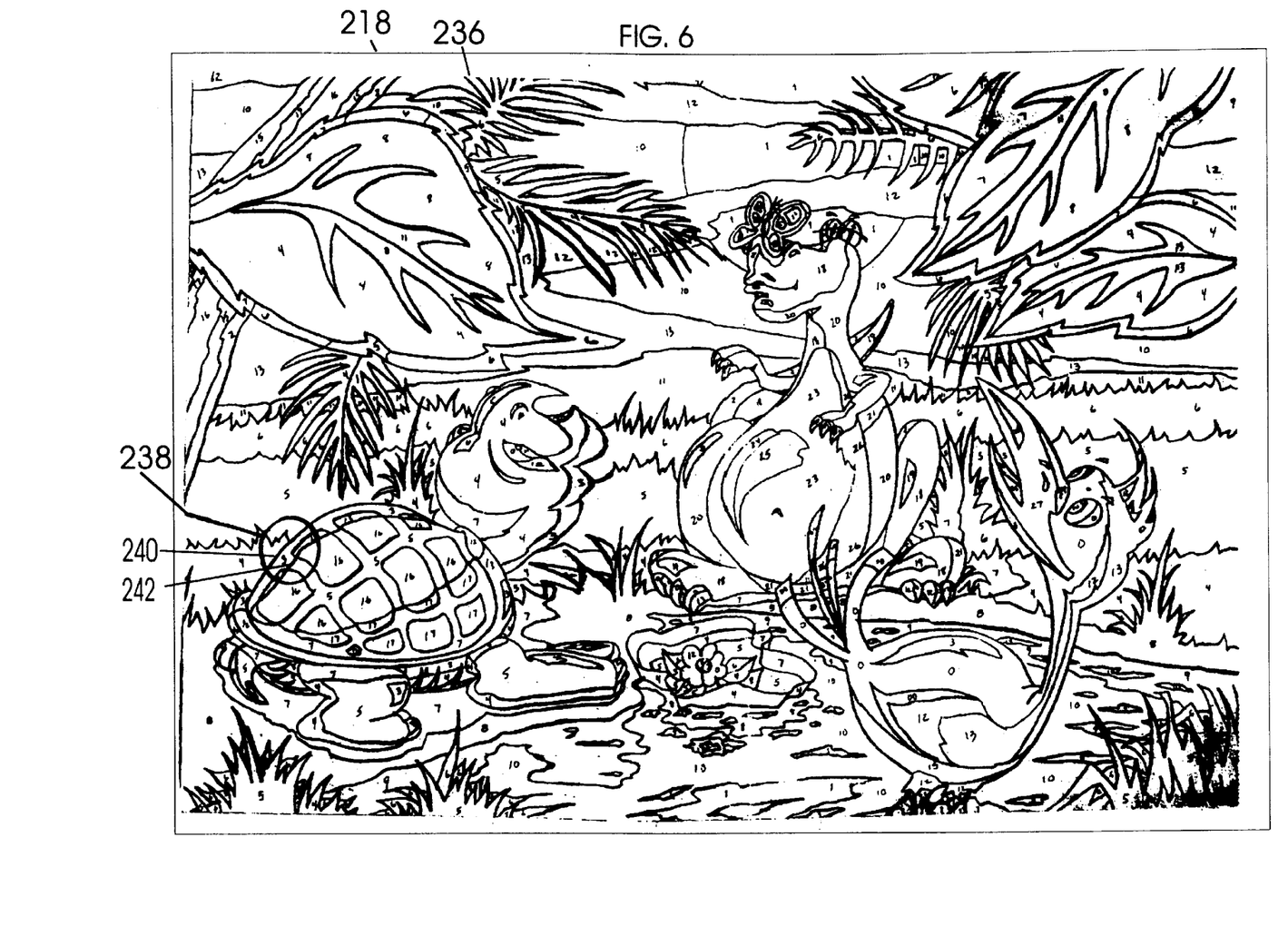
FIG. 6 shows a detailed drawing, which is mural size, in accordance with an embodiment of the present invention.

The detailed drawing 236 in FIG. 6, utilizes the colors shown numbered 00,0, 1–30 which are shown in the table above. Each region of the drawing is numbered depending on the color desired. The detailed drawing 236 indicates how complex the drawings provided by the present invention can become. The drawings can become in fact much more complex than the detailed drawing 236. The detailed drawing 236 is preferably printed on a large unified sheet 218 similar to unified sheet 118. The detailed drawing 236 is a substantially non-repeating image or drawing which appears in the preferred format of a mural.

Figure 7:
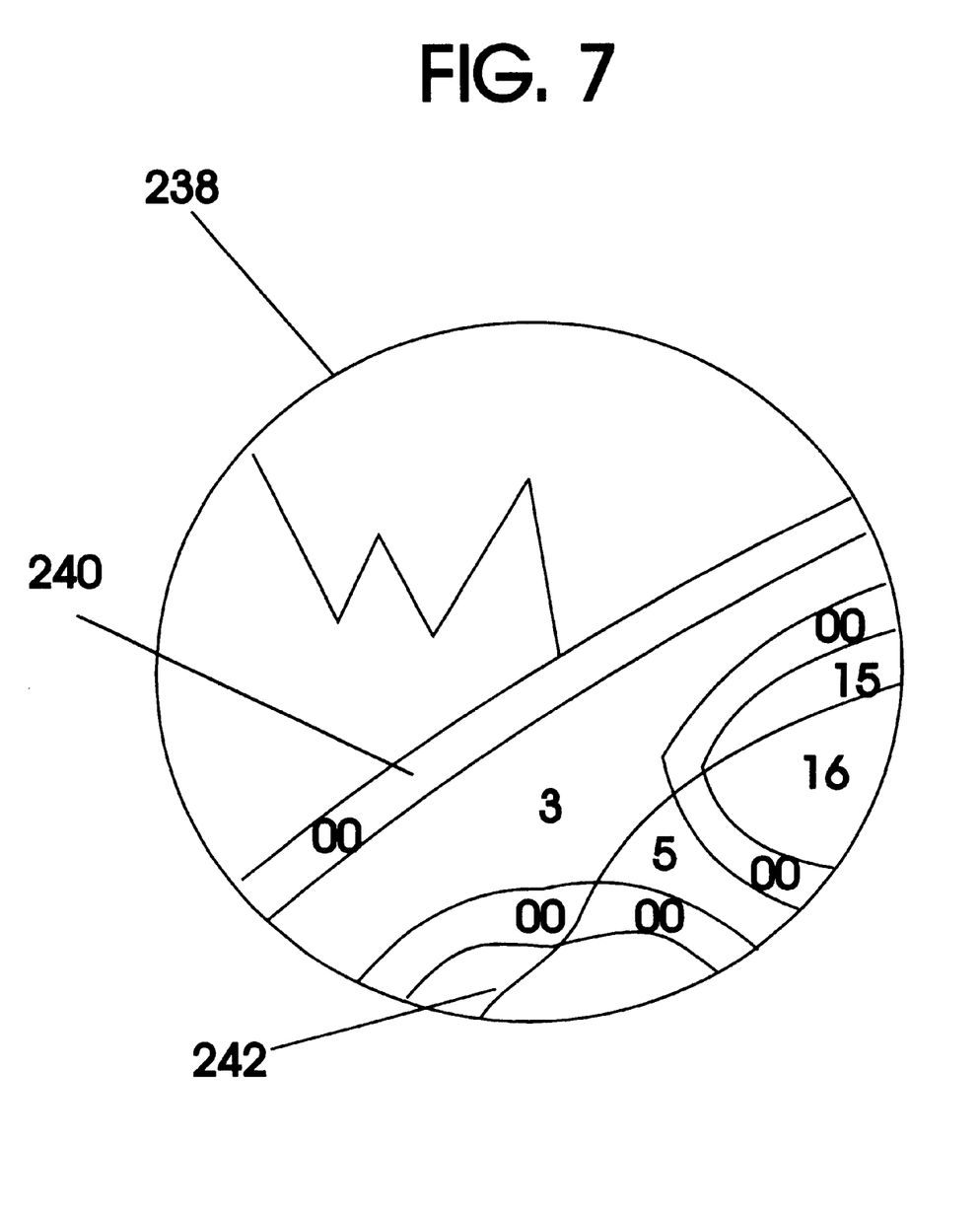
FIG. 7 shows a blown up region of the drawing of FIG. 6.

FIG. 7 shows a blow up of a particular portion 238 of the detailed drawing 236. This blowup merely indicates that it may not be possible to show all the details of drawing 236 on the container 112 or on a small card. Thus a thick line such as line 240 may actually be a pair of parallel lines as shown in the blowup of FIG. 7 and here is used to represent that further color is needed. A single thin line 242 may be used to indicate that no further color is needed between the bordering colors. Although all of the details for coloring are not shown in FIG. 6, all of the details are preferably shown on the actual large unified sheet 218, since unified sheet 218 will preferably be much larger than the eight and one half by eleven inch sheet of paper used for the drawings in this application.

Figure 8:
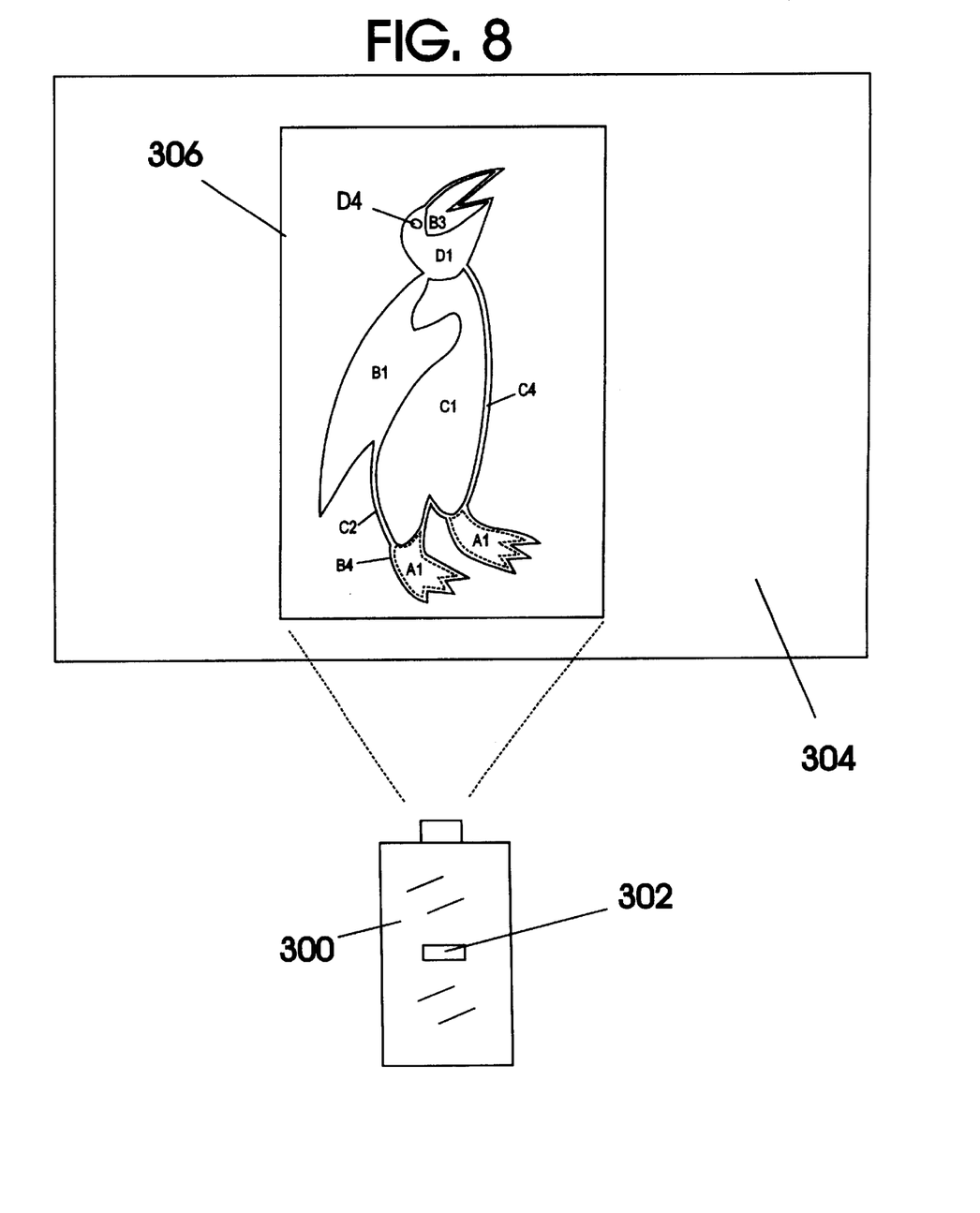
FIG. 8 shows another embodiment for transferring a drawing in accordance with the present invention.

FIG. 8 shows another embodiment of the present invention wherein a projector 300 and a slide 302 are used to transfer a drawing onto a surface of an object. The slide 302 preferably includes a skeletal black line drawing which appears as image 306 and the projector 300 is used to display the drawing on a wall 304. An individual would then trace over the projected image on the wall 304 with a pencil to effectively transfer the image onto the wall 304. After the image or drawing was transferred, painting within the regions can be performed with the aid of color/shading indicia information as previously described.

The FIG. 8 embodiment allows a user to flop or reverse the image 306 by reversing the slide 302. In addition, the size of the image 306 on the wall 304 can be altered by moving the projector closer or further from the wall 304. These are customizing features for the image 306.

Figure 9A:
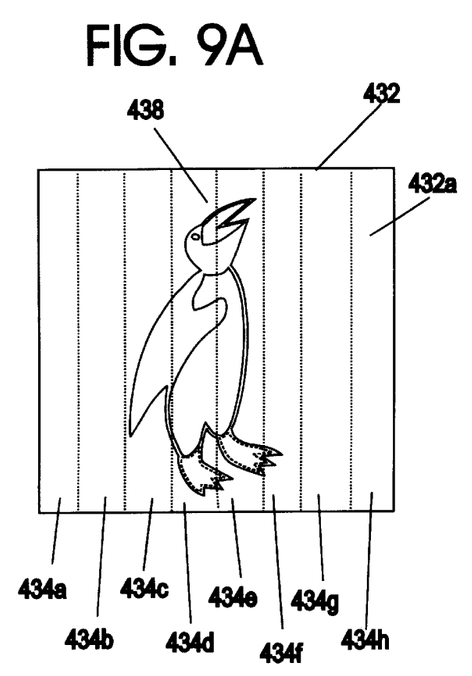
FIGS. 9A and 9B show the first and second sides of a unified wallpaper sheet in accordance with another embodiment of the present invention.
Figure 9B:
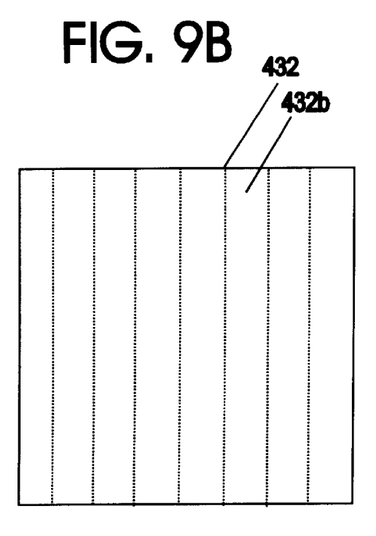
Figure 9C:
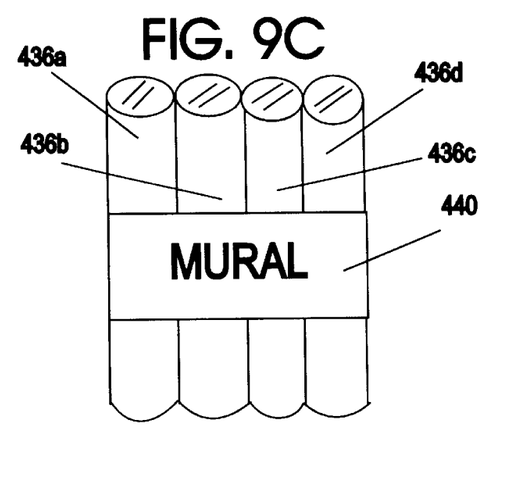
FIGS. 9C and 9D show four rolls of wallpaper to be used for a single mural which are packaged in two different manners.
Figure 9D:
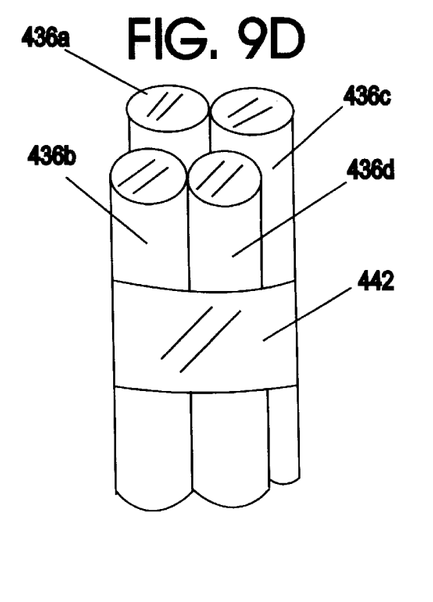

FIGS. 9A and 9B show the first side 432*a* and the second side 432*b* of a unified wallpaper sheet 432 in accordance with another embodiment of the present invention. The unified wallpaper sheet 432 is preferably comprised of eight separate sheet segments 434*a*, 434*b*, 434*c*, 434*d*, 434*e*, 434*f*, 434*g*, and 434*h*. The eight sheet segments 434*a–h* may be attached in a perforated manner or may be completely separate sheets. FIGS. 9C and 9D show four rolls 436*a*, 436*b*, 436*c*, and 436*d*. On each roll, preferably two sheet segments of the unified wallpaper sheet 432 are located. On roll 436*a*, sheet segments 434*a–b* are placed, on roll 436*b* sheet segments 434*c–d* are placed, on roll 436*c* sheet segments 434*e–f* are placed, and on roll 436*d* sheet segments 434*g–h* are placed. The sheet segments 434*a–h* are rolled up on their appropriate rolls in a manner known in the art. The rolls 436*a–d* can be packaged as shown in FIG. 9C or as in FIG. 9D or in any other manner. In each case, cellophane preferably surrounds the rolls 436*a–d*. A wrapping 440 holds the rolls 436*a–d* together in FIG. 9C and a wrapping 442 holds the rolls 436*a–d* together in FIG. 9D.

A drawing 438 is shown on the unified wallpaper sheet 432. Preferably the drawing 438 is a substantially non-repeating pattern. Preferably the drawing 438 is a large mural which can cover a surface such as a wall. The unified wallpaper sheet 432 is preferably a light weight canvass like material. The unified wallpaper sheet 432 can be applied to the surface of a wall by a pre-pasted method, as known, or for example by applying paste to the second side 432*b* and pressing the second side 432*b* against the surface of a wall. Alternatively the second side 432*b* may already have adhesive material on it. The adhesive material may be covered with a peel off backing sheet not shown. The unified wallpaper sheet 432 can be a full colored completed mural or a line drawing which will later be painted in by a user. The drawing 438 may include symbols such as "A1" etc. for coloring or shading information as shown in FIG. 3, but which are not shown in FIG. 9A.

Figure 10A:
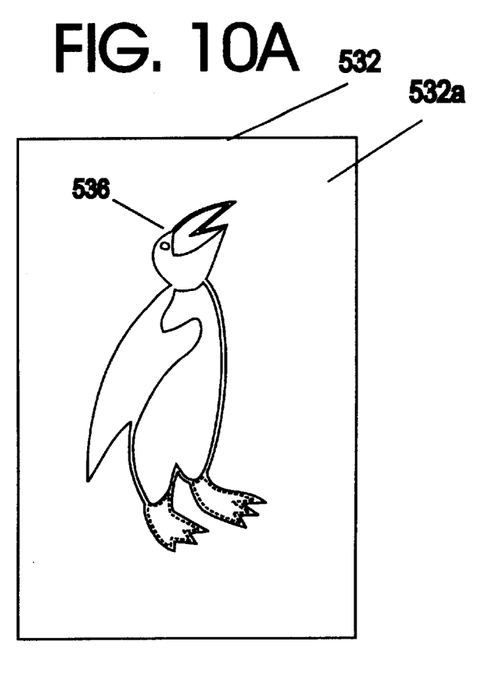
FIGS. 10A and 10B show first and second sides of a preferably transparent sheet in accordance with another embodiment.
Figure 10B:
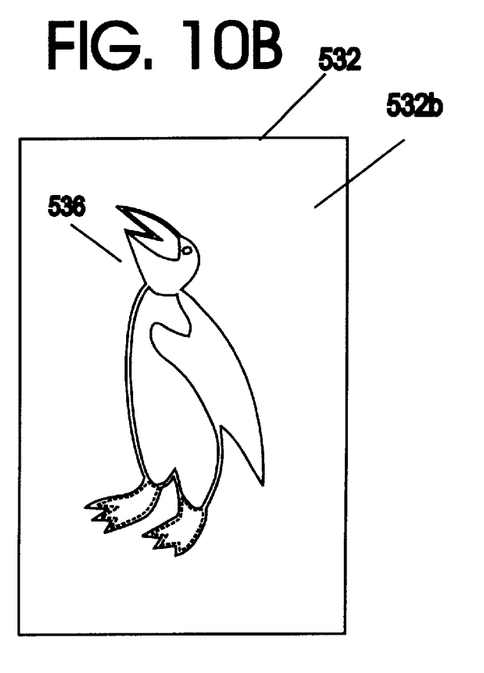
Figure 10C:
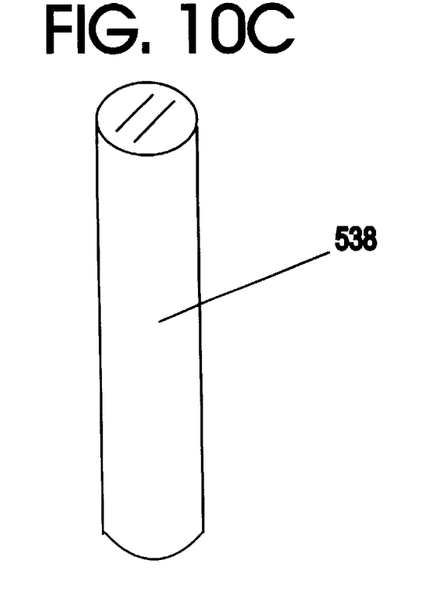
FIG. 10C shows a large roll of transparent material in accordance with another embodiment of the present invention.

FIGS. 10A and 10B show first side 532*a* and a second side 532*b* of a preferably transparent unified sheet 532 in accordance with another embodiment of the present invention. In this case a drawing 536 is printed on the second side 532*b* in reversed format. The second side 532*b* is then pressed against a surface such as a wall, so that the second side 532*b* is contacting the wall and the first side 532*a* is facing away from the wall. The drawing 536 is preferably not printed on the first side 532*a*, but rather shows through the transparent unified sheet 532. An individual can transfer the drawing 536 to a wall by applying heat, by rubbing or by means of a solvent. Some of these techniques are known for applying temporary tatoos to a human body or for applying decals to tee-shirts. Techniques known include Letra-set, Iron-on Transfer, or transfer of temporary tatoos. FIG. 10C shows a large roll 538 on which the unified transparent sheet 532 is placed. The unified transparent sheet 532 may preferably be 8 feet by 12 feet, or can be other sizes depending on the purpose. The large roll 538 is preferably eight feet in height. The eight feet represents the height from floor to ceiling in many rooms of many homes.

The drawings 536 of FIG. 10A and 438 of FIG. 9A can be either simple skeletal line drawings with or without symbols for color information, or may be full color completed drawings. The drawings are preferably mural size. The full color completed drawing transfer method allows even a lazy individual to easily transfer a drawing such as a mural onto a surface, such as a wall. The drawing, such as a mural, will preferably take the texture of the surface of the wall.

Figure 11:
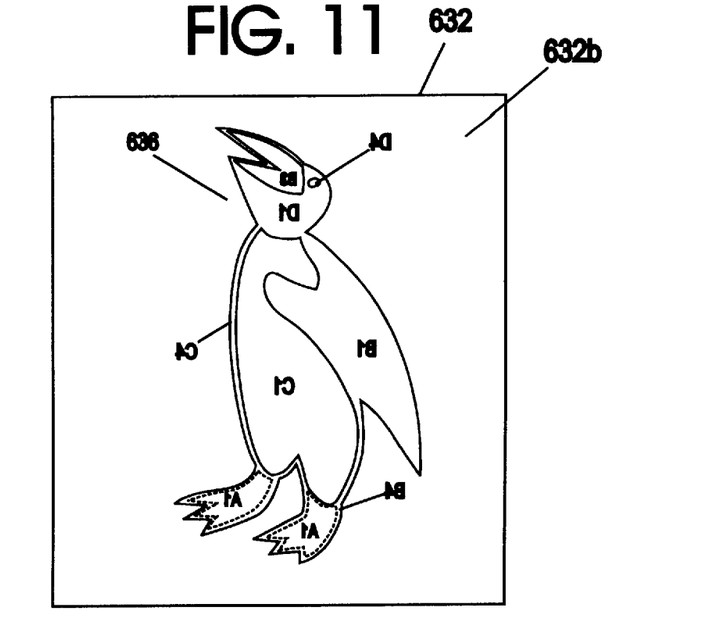
FIG. 11 shows a second side of a transparent sheet in accordance with another embodiment of the present invention.
Figure 12:
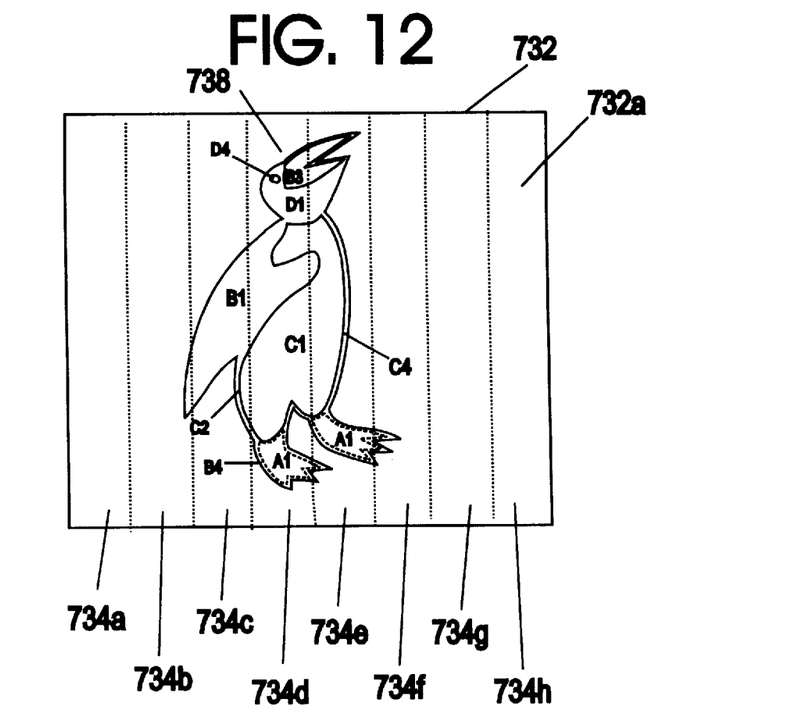
FIG. 12 shows a first side of a unified wallpaper sheet.

FIG. 11 shows a second side 632*b* of a transparent sheet 632 similar to the transparent unified sheet 532 shown in FIG. 10B. The difference is that symbols, such as "A1" and "B4" are shown on the drawing 636 to allow provide information for coloring or shading the drawing 636. Note that the symbols "A1" etc., shown on FIG. 11 are in reversed format. This is because the second side 632*b* will contact the surface of an object. FIG. 12 shows a unified wallpaper sheet 732 having a first side 732*a*, and having sheet segments 734*a–h* similar to unified wallpaper sheet 432 shown in FIG. 9A. Again the difference is that symbols, such as "A1" and "B4" are shown on the drawing 738. FIGS. 11 and 12 are shown merely to emphasize that line drawings can be provided with or without symbols and the drawings can take any form. The drawings can even be full-color completed drawings.

The unified sheets 118 and 218, the unified wallpaper sheet 432 and the transparent sheet 532 may be designed to be the size of rooms such as—four by six feet, six by eight feet, or eight by ten feet, but many different sizes are contemplated. The size of the unified sheet is preferably indicated on the container 112.

The present invention in some embodiments advantageously provides an alternative to wall paper in that large color murals can be provided without damaging walls and modifying the murals merely requires a covering coat of white paint. In some embodiments the present invention provides a method and apparatus for applying a large, substantially non-repeating, and mural-like drawing, image or pattern to a surface such as a wall. In some embodiments the present invention provides an additional home decorating technique in addition to normal wallpaper and painting.

The present invention provides a use for computer color matching systems in paint stores which provide bright colors but as yet have not found a mass appeal. Consumers have been too frightened to use color matching machines with bright colors fearing those colors would have no place in the home. However, the present invention allows one to use such colors for painting murals in children's rooms and for a myriad of other home decoration purposes. The paint from these computer matching machines typically comes out only in quarts. The mixing aspect of the present invention allows one to make a small amount of paint, if necessary, to cover an appropriate region. The mixing aspect of the present invention allows the colors of favorite cartoon characters to be matched exactly and thus permits a high standard of quality to be maintained. However, aspects of the present invention may make it financially attractive to reconfigure the computer matching machines to provide color quantities in pints, which in some cases may eliminate the need for mixing colors.

A videotape instructing one how to implement the present invention and teaching how to go around windows may be provided. In addition, written instructions may be provided.

The paint employed with embodiments of the present invention can be any kind such as oil based or water based, gloss paint, satin paint. When painting over an existing mural it is preferred that white paint is used and then the new mural can be painted.

The actual finished mural is preferably shown in an appropriate setting, such as a baby's nursery, on the container, such as container 112. A card can be enclosed stating the type of paint to use for a particular environment such as for nurseries and hospital, i.e. odorless and non-toxic paints, such as Pristine Paints (trademarked), (manufactured by Benjamin Moore). A slide of the drawing can be made available for various applications. A hand held example of the finished mural can be provided for quick reference, which can be the size of the postcard.

I claim:

1. A method comprising the steps of:
providing instructions in a tangible medium on how to paint a mural on a wall, said mural comprised of a plurality of paints each paint having a different color;
providing a picture of a completed version of the mural;
providing the plurality of paints from a machine located in a store; and
providing a paint can comprised of a label which identifies the plurality of paints to be used in painting the mural.

2. The method of claim 1 further comprising the step of:
providing a plurality of color samples in a tangible medium said color samples being distinct from the picture of the completed version of the mural, each of the plurality of color samples corresponding to and having the same color as one of the plurality of paints of the mural.

3. The method of claim 1 wherein
the machine located in the store is a computer color matching machine.

4. The method of claim 1 further comprising the step of:
identifying a name of a paint manufacturer line of paints for use in painting the mural.

5. The method of claim 1 further comprising the steps of:
providing a skeletal outline of the mural.

6. The method of claim 1 further comprising
providing a skeletal outline of the mural;
and wherein the skeletal outline of the mural includes a means for transferring the mural to a wall.

7. The method of claim 1 further comprising
providing a skeletal outline of the mural;
and wherein the skeletal outline is comprised of a plurality of regions and each region is identified by one or more alphanumeric characters.

8. A method comprising the steps of:
providing instructions in a tangible medium on how to paint a mural on a wall, said mural comprised of a plurality of paints each paint having a different color;
providing a picture of a completed version of the mural;
providing the plurality of paints from a machine located in a store; and
specifying amounts needed for each of the plurality of paints of the mural, wherein each of the plurality of paints is applied directly to the mural, and the amounts needed for at least one of the plurality of paints differ from the amounts needed for another of the plurality of paints.

* * * * *